United States Patent
Ivans

(10) Patent No.: US 10,933,990 B2
(45) Date of Patent: Mar. 2, 2021

(54) MODAL TAILBOOM FLIGHT CONTROL SYSTEMS FOR COMPOUND HELICOPTERS

(71) Applicant: Bell Textron Inc., Fort Worth, TX (US)

(72) Inventor: Steven Ray Ivans, Ponder, TX (US)

(73) Assignee: Bell Textron Inc., Fort Worth, TX (US)

( * ) Notice: Subject to any disclaimer, the term of this patent is extended or adjusted under 35 U.S.C. 154(b) by 298 days.

(21) Appl. No.: 16/247,817

(22) Filed: Jan. 15, 2019

(65) Prior Publication Data
US 2020/0223540 A1    Jul. 16, 2020

(51) Int. Cl.
B64C 27/82    (2006.01)
B64C 27/26    (2006.01)

(52) U.S. Cl.
CPC ............. *B64C 27/82* (2013.01); *B64C 27/26* (2013.01); *B64C 2027/8227* (2013.01); *B64C 2027/8236* (2013.01)

(58) Field of Classification Search
CPC ........ B64C 27/22; B64C 27/26; B64C 27/82; B64C 27/8236; B64C 27/8245; B64C 27/8254; B64C 27/8263; B64C 27/8272; B64C 27/8281
See application file for complete search history.

(56) References Cited

U.S. PATENT DOCUMENTS

| 2,698,147 | A | * | 12/1954 | Hovgard | B64C 27/12 244/7 R |
| 3,105,659 | A |   | 10/1963 | Stutz | |
| 3,448,946 | A | * | 6/1969  | Nagatsu | B64C 27/12 244/17.19 |
| 3,540,680 | A | * | 11/1970 | Peterson | B64C 27/82 244/17.19 |
| 3,563,496 | A | * | 2/1971  | Zuck | B64C 27/026 244/7 A |
| 4,514,142 | A |   | 4/1985  | Young | |
| 4,531,692 | A | * | 7/1985  | Mateus | B64C 27/10 244/17.19 |

(Continued)

FOREIGN PATENT DOCUMENTS

CN    102700708 A    10/2012

OTHER PUBLICATIONS

European Examination Report; Application No. 20150763.9; EPO; dated Jun. 19, 2020.

(Continued)

*Primary Examiner* — Richard R. Green
*Assistant Examiner* — Michael A. Fabula
(74) *Attorney, Agent, or Firm* — Lawrence Youst PLLC

(57) ABSTRACT

A modal tailboom flight control system for a compound helicopter is operable in a plurality of modes including a forward thrust mode and an anti-torque mode. The modal tailboom flight control system includes a tailboom, a drivetrain extending through the tailboom, an anti-torque system coupled to the drivetrain and rotatable to generate anti-torque thrust for the compound helicopter in the anti-torque mode and a pusher propeller coupled to the drivetrain and rotatable to generate forward thrust for the compound helicopter in the forward thrust mode. The pusher propeller is positioned forward of the anti-torque system.

18 Claims, 7 Drawing Sheets

(56) References Cited

U.S. PATENT DOCUMENTS

| | | | | |
|---|---|---|---|---|
| 4,632,337 A | * | 12/1986 | Moore | B64C 27/12 |
| | | | | 244/17.19 |
| 4,928,907 A | | 5/1990 | Zuck | |
| 5,738,301 A | * | 4/1998 | Francois | B64C 27/26 |
| | | | | 244/17.19 |
| 7,438,259 B1 | * | 10/2008 | Piasecki | B64C 27/26 |
| | | | | 244/6 |
| 8,979,015 B2 | * | 3/2015 | Gaillard | B64C 27/82 |
| | | | | 244/17.19 |
| 2005/0151001 A1 | | 7/2005 | Loper | |
| 2017/0349276 A1 | | 12/2017 | Fenny | |
| 2020/0070996 A1 | * | 3/2020 | Hefner | B64C 27/06 |
| 2020/0317331 A1 | * | 10/2020 | Fenny | G05D 1/0858 |

OTHER PUBLICATIONS

European Search Report; Application No. 20150763.9; EPO; dated Jun. 9, 2020.

\* cited by examiner

MODAL TAILBOOM FLIGHT CONTROL SYSTEMS FOR COMPOUND HELICOPTERS

TECHNICAL FIELD OF THE DISCLOSURE

The present disclosure relates, in general, to tailbooms of compound helicopters and, in particular, to tailboom flight control systems operable in a variety of modes and having a pusher propeller and/or other flight control elements positioned forward of an anti-torque system.

BACKGROUND

The cyclic control of a conventional helicopter is used to cyclically vary the attack angles of the rotor blades of a main rotor to change the helicopter's direction of movement. Conventional helicopters have a limited top speed due to the problem of retreating blade stall, in which the rotor blade with the smaller resultant relative wind exceeds the critical angle of attack. Attempts have also been made to overcome retreating blade stall by utilizing an "advancing blade concept," in which rotor blades advance on both sides of the rotorcraft during flight, typically by employing two counter rotating rotors. It has been found, however, that advancing blade concept rotorcraft are particularly susceptible to structural vibration, contributing to crew fatigue, increased operating costs and structural instability.

Other attempts have been made to overcome retreating blade stall by utilizing compound helicopters, or gyrodynes, which are type of vertical takeoff and landing (VTOL) aircraft with both a helicopter rotor-like system for hover, takeoff and landing and also a conventional propeller, such as a pusher propeller, to provide forward thrust during cruising flight. Current compound helicopters, however, position the pusher propeller aft of the tail rotor, thereby reducing the lever arm on which anti-torque thrust may act and requiring the tail rotor to be placed outboard of the pusher propeller rotor disk. Current compound helicopters may also lack multi-modal flight capabilities and/or fail to adequately protect the pusher propeller.

SUMMARY

In a first aspect, the present disclosure is directed to a modal tailboom flight control system for a compound helicopter operable in a plurality of modes including a forward thrust mode and an anti-torque mode. The modal tailboom flight control system includes a tailboom, a drivetrain extending through the tailboom, an anti-torque system coupled to the drivetrain and rotatable to generate anti-torque thrust for the compound helicopter in the anti-torque mode and a pusher propeller coupled to the drivetrain and rotatable to generate forward thrust for the compound helicopter in the forward thrust mode. The pusher propeller is positioned forward of the anti-torque system.

In some embodiments, the rotational speed of the pusher propeller may increase relative to the rotational speed of the anti-torque system in the forward thrust mode and the rotational speed of the pusher propeller may decrease relative to the rotational speed of the anti-torque system in the anti-torque mode. In certain embodiments, the pusher propeller and the anti-torque system may each include variable pitch rotor blades. In such embodiments, the variable pitch rotor blades of the pusher propeller may be pitched to increase the forward thrust generated by the pusher propeller in the forward thrust mode and the variable pitch rotor blades of the anti-torque system may be pitched to increase the anti-torque thrust generated by the anti-torque system in the anti-torque mode. In some embodiments, the compound helicopter may be operable in a forward flight mode and a vertical takeoff and landing mode. In such embodiments, the modal tailboom flight control system may be in the forward thrust mode when the compound helicopter is in the forward flight mode and in the anti-torque mode when the compound helicopter is in the vertical takeoff and landing mode. In certain embodiments, the tailboom may include a tapered aft end, and the anti-torque system may be rotatably coupled to the tapered aft end of the tailboom.

In some embodiments, the anti-torque system may include a tail rotor. In certain embodiments, the tail rotor may include a tail rotor hub assembly offset by a distance D from the centerline of the compound helicopter, the pusher propeller has a radius R and the distance D may be less than the radius R. In other embodiments, the distance D may be less than half of the radius R. In certain embodiments, the anti-torque system may include a cross-flow fan. In some embodiments, the pusher propeller may include a rotor hub fairing substantially flush with the tailboom. In certain embodiments, the modal tailboom flight control system may include a flight stabilizer positioned forward of the pusher propeller. In some embodiments, the flight stabilizer may partially obstruct a forward side of the pusher propeller to protect the pusher propeller from debris during flight. In certain embodiments, the flight stabilizer may include a horizontal stabilizer. In some embodiments, the pusher propeller has a diameter D, the horizontal stabilizer has a width W and the diameter D may be less than the width W. In certain embodiments, the anti-torque system may include a tail rotor hub assembly offset by a distance D from the centerline of the compound helicopter, the horizontal stabilizer has a width W and the distance D may be less than half of the width W. In some embodiments, the flight stabilizer may include vertical fins coupled to outboard ends of the horizontal stabilizer.

In a second aspect, the present disclosure is directed to a compound helicopter including a fuselage and a modal tailboom flight control system coupled to the fuselage and operable in a plurality of modes including a forward thrust mode and an anti-torque mode. The modal tailboom flight control system includes a tailboom, a drivetrain extending through the tailboom, an anti-torque system coupled to the drivetrain and rotatable to generate anti-torque thrust in the anti-torque mode and a pusher propeller coupled to the drivetrain and rotatable to generate forward thrust in the forward thrust mode. The pusher propeller is positioned forward of the anti-torque system.

In some embodiments, the drivetrain may include a pusher propeller clutch and an anti-torque system clutch, and the rotational speeds of the pusher propeller and the anti-torque system may be independently controllable using the pusher propeller clutch and the anti-torque system clutch. In certain embodiments, the drivetrain may include an extension driveshaft, aft of the pusher propeller, to transmit rotational energy to the anti-torque system. In some embodiments, the compound helicopter may include first and second wings protruding from the sides of the fuselage. In certain embodiments, the modal tailboom flight control system may include a flight stabilizer positioned forward of the pusher propeller. In such embodiments, the flight stabilizer has a width W, the first and second wings form a wingspan Z and the width W is less than the wingspan Z. In some embodiments, the mode of the modal tailboom flight control system may be switchable based on pilot input.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
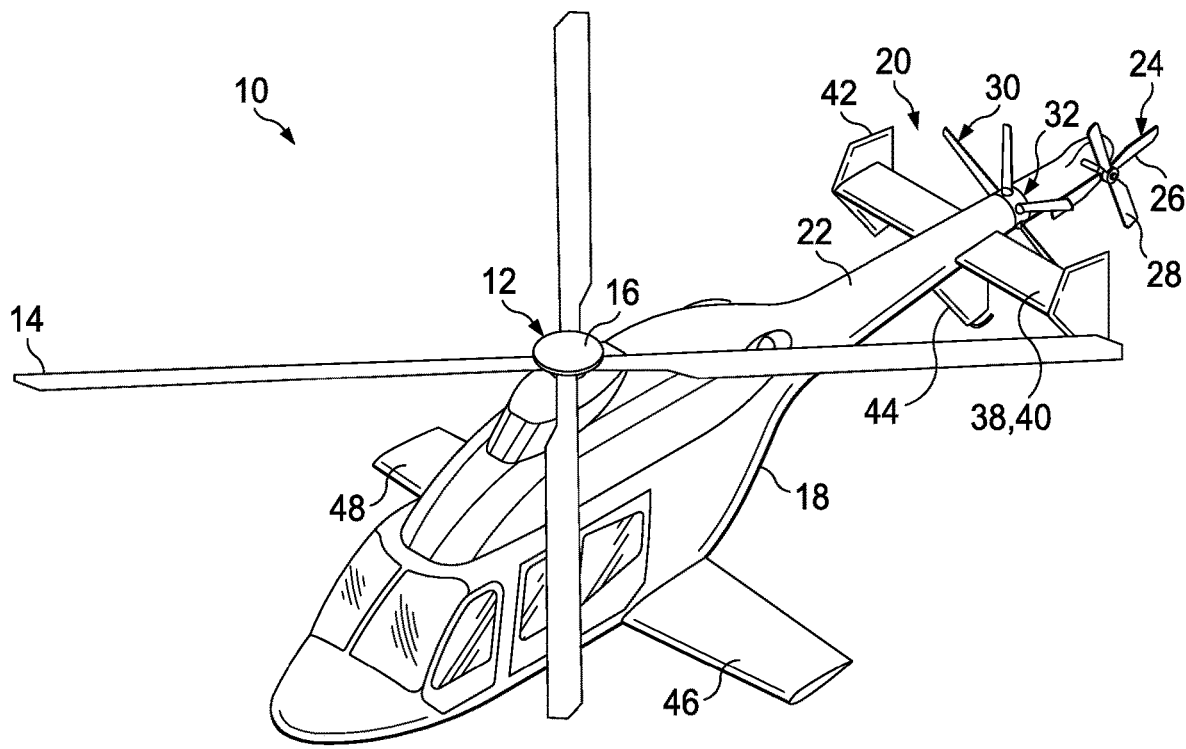
FIGS. 1A-1C are schematic illustrations of a helicopter having a modal tailboom flight control system in accordance with embodiments of the present disclosure.
Figure 1B:
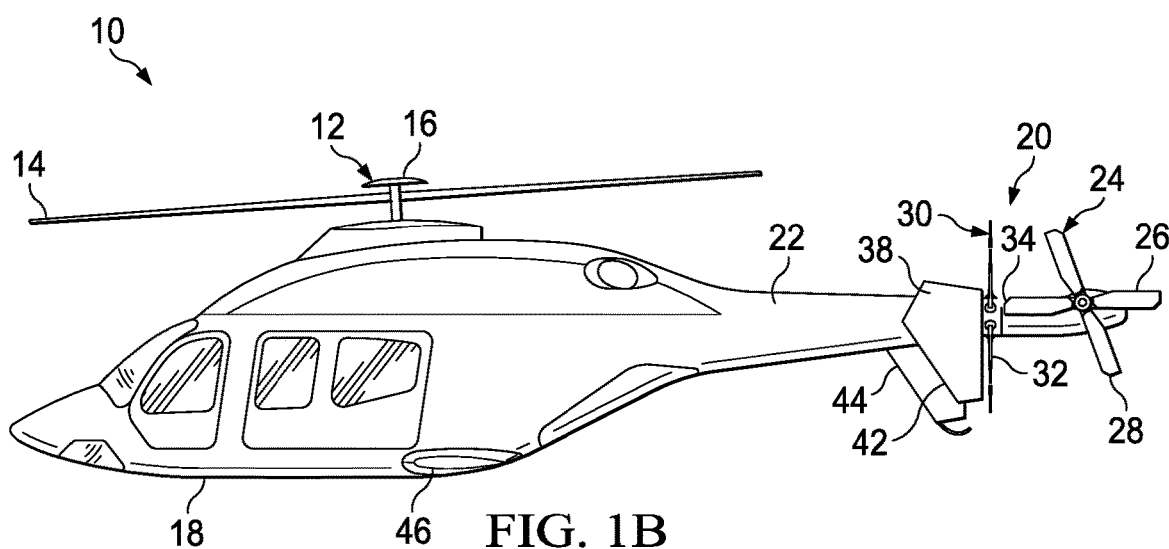
Figure 1C:
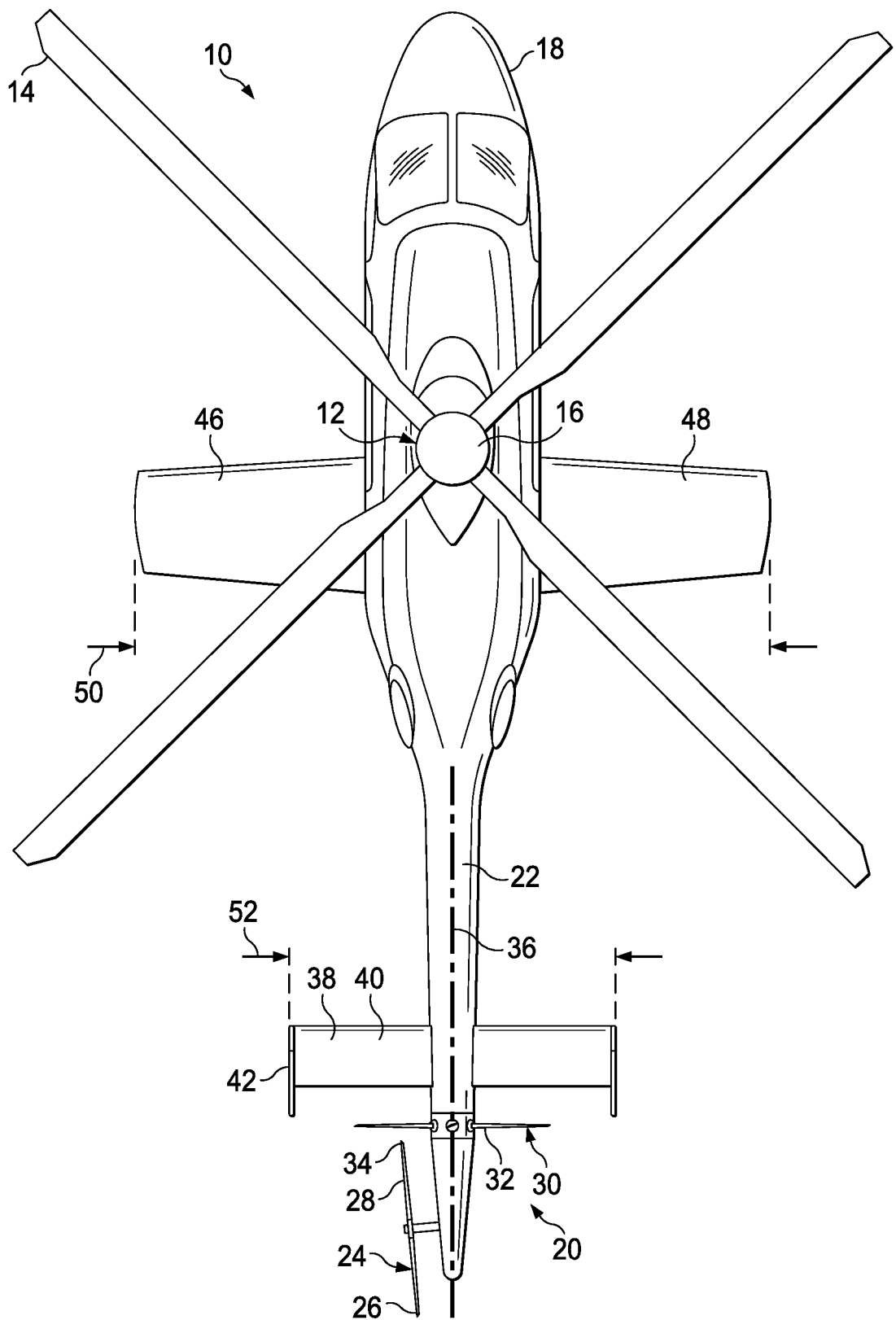

Referring to FIGS. 1A-1C in the drawings, a compound helicopter is schematically illustrated and generally designated 10. The primary propulsion assembly of compound helicopter 10 is a main rotor assembly 12. Main rotor assembly 12 includes a plurality of rotor blades 14 extending radially outward from a main rotor hub 16. Main rotor assembly 12 is coupled to a fuselage 18. Main rotor hub 16 is rotatable relative to fuselage 18. The pitch of rotor blades 14 can be collectively and/or cyclically manipulated to selectively control direction, thrust and lift of compound helicopter 10. A retractable landing gear system provides ground support for compound helicopter 10.

A modal tailboom flight control system 20 includes a tailboom 22 coupled to fuselage 18 and extending from fuselage 18 in the aft direction. An anti-torque system 24 includes a tail rotor 26 that is rotatably coupled to the aft end of tailboom 22. Anti-torque system 24 controls the yaw of compound helicopter 10 by counteracting the torque exerted on fuselage 18 by main rotor assembly 12. While tail rotor 26 is illustrated as including four tail rotor blades 28, tail rotor 26 may have any number of tail rotor blades. The magnitude of anti-torque thrust generated by tail rotor 26 may be varied in a variety of ways. For example, tail rotor blades 28 may be variable pitch tail rotor blades whose pitch is changeable by a pitch change mechanism. In another example, tail rotor blades 28 may be fixed pitch tail rotor blades and tail rotor 26 may be clutchable and/or have a variable rotational speed.

Positioned forward of anti-torque system 24 on tailboom 22 is a translational thrust system 30 including a pusher propeller 32 that propels compound helicopter 10 in a forward direction. Assisted by pusher propeller 32, compound helicopter 10 may be capable of high forward airspeed. By propelling compound helicopter 10 in the forward direction, pusher propeller 32 may also reduce the drag burden on main rotor assembly 12. Pusher propeller 32 may be a variable pitch pusher propeller, variable speed pusher propeller and/or clutchable pusher propeller. Pusher propeller 32 is positioned forward of a forward edge of tail rotor 26, depicted as tip 34, such that the rotor disks of tail rotor 26 and pusher propeller 32 do not interfere with each other. In other embodiments, the rotor disks of tail rotor 26 and pusher propeller 32 may overlap and the rotational speeds of tail rotor 26 and pusher propeller 32 may be synchronized to prevent the rotor blades of pusher propeller 32 from contacting tail rotor blades 28.

Positioning pusher propeller 32 forward of tail rotor 26 provides several benefits for compound helicopter 10. Unlike previous compound helicopters in which the pusher propeller is the aft-most element of the tailboom, tail rotor 26 may be positioned at or near centerline 36 of compound helicopter 10 and in the slipstream of pusher propeller 32. Positioning tail rotor 26 on the aft-most section of tailboom 22 also maximizes the lever arm and moment exerted on fuselage 18 to provide more efficient anti-torque thrust for compound helicopter 10. A forward-positioned pusher propeller 32 allows compound helicopter 10 to achieve high forward airspeed while maintaining a small footprint. In one non-limiting example, compound helicopter 10 may have a footprint size of equal to or less than 40 feet wide by 40 feet long while achieving forward airspeeds upward of 180 knots, as compared to conventional helicopters that are larger and capable of forward airspeeds of only 125 to 150 knots.

A flight stabilizer 38 is coupled to tailboom 22 and positioned forward of pusher propeller 32. Pusher propeller 32 is thus interposed between tail rotor 26 and flight stabilizer 38. Flight stabilizer 38 provides orientational stability for compound helicopter 10 during forward flight. By positioning flight stabilizer 38 in front of pusher propeller 32 and tail rotor 26, flight stabilizer 38 at least partially obstructs a forward side of pusher propeller 32 to protect pusher propeller 32 and tail rotor 26 during flight. Flight stabilizer 38 includes a horizontal stabilizer 40 for pitch stability and vertical fins 42 for yaw stability during forward flight. Vertical fins 42 are coupled to the outboard ends of horizontal stabilizer 40. Flight stabilizer 38 may also include a central vertical fin 44 on the underside of tailboom 22 to provide additional yaw stability and protection of pusher propeller 32 and tail rotor 26 from ground strike. In some embodiments, horizontal stabilizer 40 may include one or more movable control surfaces such as elevators for additional pitch control and vertical fins 42 may include one or more movable control surfaces such as rudders for additional yaw control. In other embodiments, tailboom 22 may not include a flight stabilizer and the forward side of pusher propeller 32 may be unobstructed.

Compound helicopter 10 also includes wings 46, 48 protruding from the sides of fuselage 18. Wings 46, 48 produce lift while compound helicopter 10 is in forward flight, thereby partially offloading the lift required of main rotor assembly 12. The lift provided by wings 46, 48 may help to offset the reduced lift capacity of main rotor assembly 12 at high forward airspeeds. Wings 46, 48 may be structurally separate wings or may form part of a unitary wing that traverses fuselage 18. As best seen in FIG. 1C, wings 46, 48 form a wingspan 50 that is wider than width 52 of flight stabilizer 38. The ratio of wingspan 50 to width 52 may vary depending on the embodiment and include ratios such as 1.1:1, 1.25:1, 1.5:1, 1.8:1, 2:1, 2.5:1, 3:1 as well as other ratios.

The thrusts produced by tail rotor 26 and pusher propeller 32 are independently controllable to allow modal tailboom flight control system 20 to operate in a variety of modes including a forward thrust mode and an anti-torque mode. In anti-torque mode, the rotational speed of pusher propeller 32 decreases and the rotational speed of tail rotor 26 increases to generate anti-torque thrust for compound helicopter 10. In forward thrust mode, the rotational speed of pusher propeller 32 increases and the rotational speed of tail rotor 26 decreases to generate forward thrust for compound helicopter 10. In other embodiments, instead of relying on rotational speed, tail rotor 26 and pusher propeller 32 may instead have variable pitch blades to alter the anti-torque thrust and forward thrust, respectively.

The mode of modal tailboom flight control system 20 may be responsive to the mode of compound helicopter 10. For example, compound helicopter 10 may be operable in a forward flight mode and a vertical takeoff and landing (VTOL) mode. In certain embodiments, modal tailboom flight control system 20 may be in forward thrust mode when compound helicopter 10 is in forward flight mode. Conversely, modal tailboom flight control system 20 may be in anti-torque mode when compound helicopter 10 is in VTOL mode, including during hover operations. The modality of modal tailboom flight control system 20 allows additional anti-torque thrust to be generated by tail rotor 26 in takeoff, landing and hover operations and additional forward thrust to be generated by pusher propeller 32 in forward flight.

Modal tailboom flight control system 20 may be switchable between forward thrust mode and anti-torque mode based on pilot input, such as cyclic control, collective control or other manual input. In other embodiments, compound helicopter 10 may switch between forward thrust mode and anti-torque mode based on sensory input from sensors in compound helicopter 10. For example, modal tailboom flight control system 20 may switch to forward thrust mode based on one or more airspeed sensors detecting if or when compound helicopter 10 exceeds a threshold forward airspeed. In another non-limiting example, modal tailboom flight control system 20 may switch to anti-torque mode based on a yaw rate sensor. Modal tailboom flight control system 20 is not restricted to being in either forward thrust mode or anti-torque mode at any given time, as modal tailboom flight control system 20 may be in neither or both of these modes at the same time. For example, if yaw or anti-torque control is required during forward flight, modal tailboom flight control system 20 may be in both forward thrust mode and anti-torque mode at the same time even though compound helicopter 10 is in forward flight mode. In such a dual modality scenario, both tail rotor 26 and pusher propeller 32 may have an increased rotational speed, or pitch angle, to generate both anti-torque thrust and forward thrust.

Figure 2:
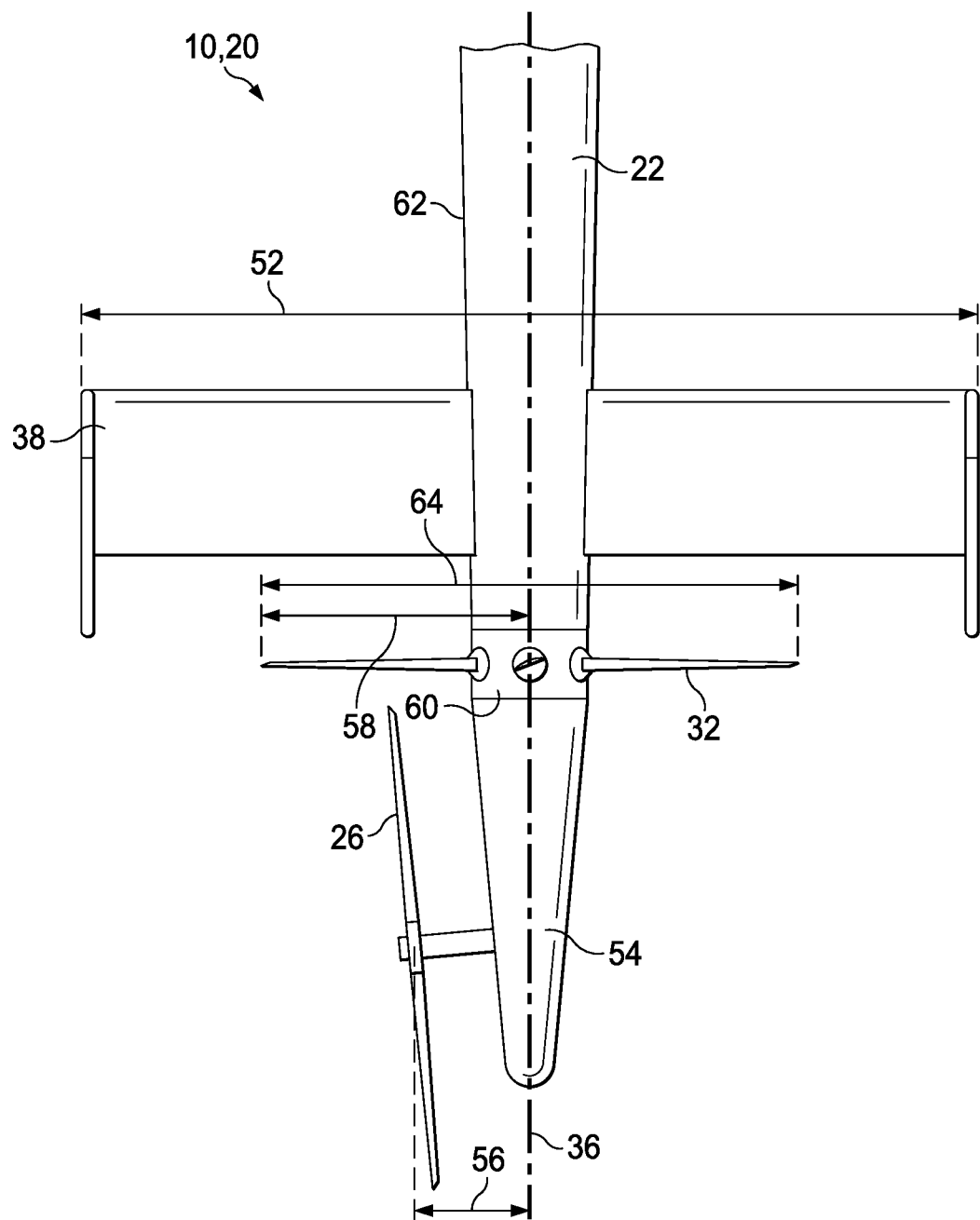
FIG. 2 is a top view of a modal tailboom flight control system in accordance with embodiments of the present disclosure.
Figure 3A:
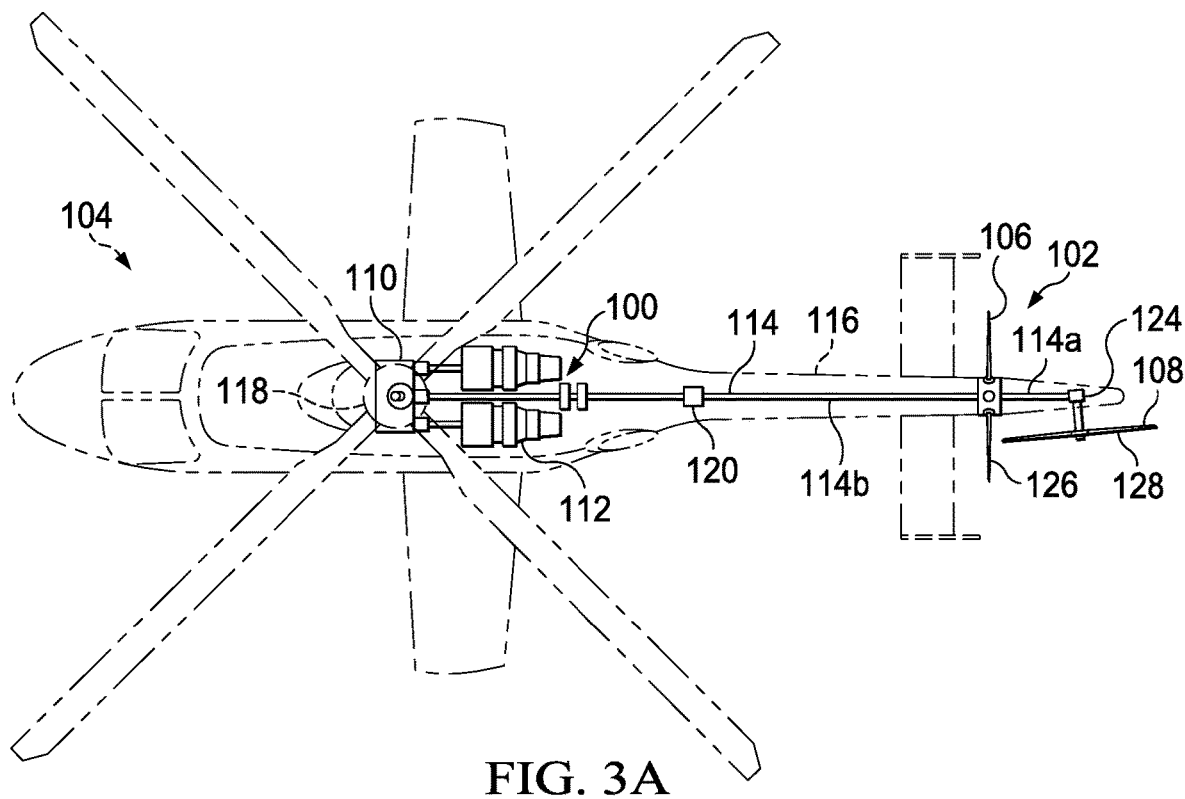
FIGS. 3A-3D are various views of a drivetrain for a modal tailboom flight control system in accordance with embodiments of the present disclosure.
Figure 3B:
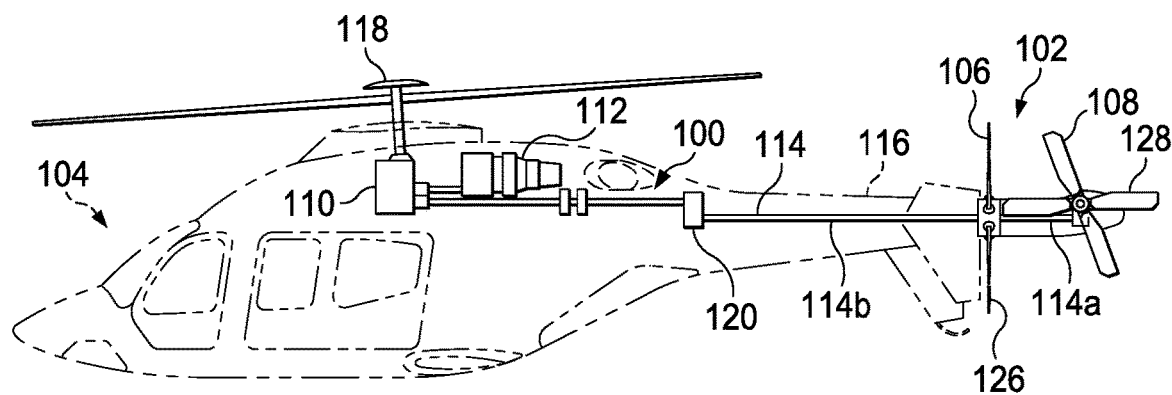
Figure 3C:
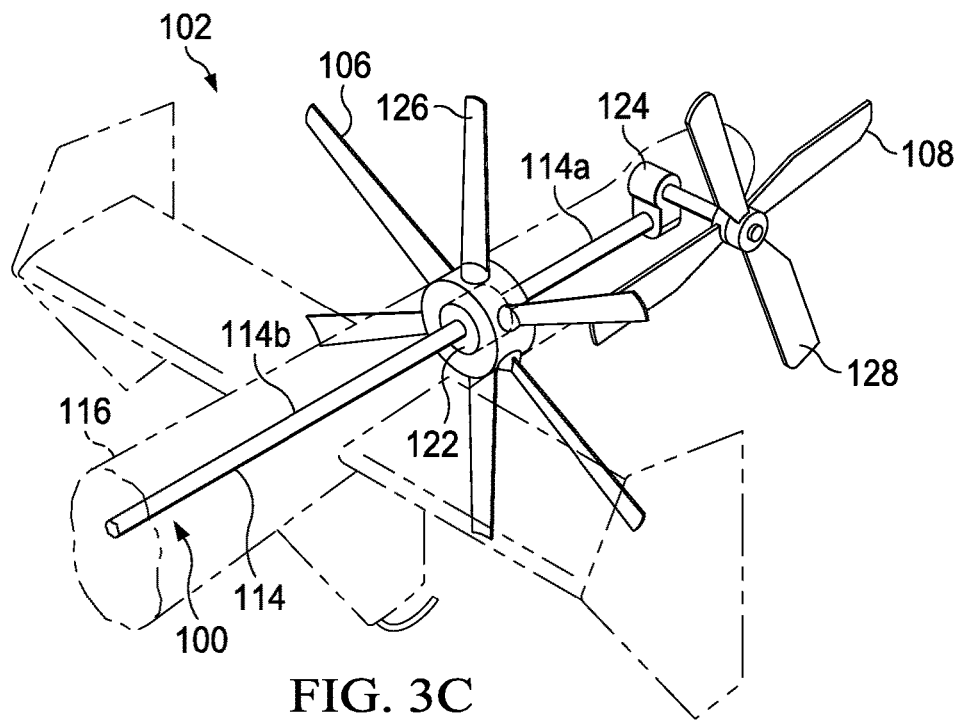
Figure 3D:
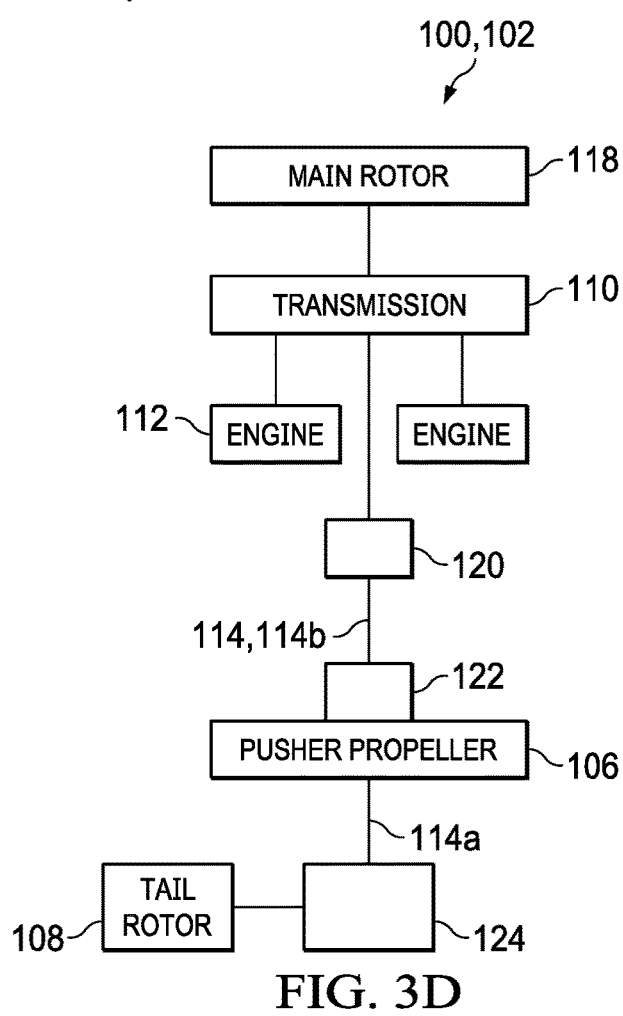

Referring to FIG. 2 in the drawings, a closeup of modal tailboom flight control system 20 is schematically illustrated. Tailboom 22 has a tapered aft end 54 to which tail rotor 26 is rotatably coupled. By positioning tail rotor 26 aft of pusher propeller 32, tail rotor 26 is positionable at or near centerline 36 of compound helicopter 10. In the illustrated embodiment, tail rotor 26 is offset from centerline 36 by a distance 56, which is less than radius 58 of pusher propeller 32. In other embodiments, offset distance 56 may be less than half of radius 58 of pusher propeller 32. Indeed, offset distance 56 may be less than radius 58 by any ratio. For example, offset distance 56 may be 90 percent, 75 percent, 33 percent, 25 percent, 10 percent or 1 percent of radius 58 of pusher propeller 32. Offset distance 56 is also less than half of width 52 of flight stabilizer 38. Offset distance 56 may be less than width 52 by any ratio. For example, offset distance 56 may be 40 percent, 30 percent, 20 percent, 10 percent, 5 percent or 1 percent of width 52 of flight stabilizer 38.

The rotor hub of pusher propeller 32 is surrounded by a rotor hub fairing 60 that is substantially flush with skin 62 of tailboom 22 to enhance the aerodynamic properties of compound helicopter 10. Diameter 64 of pusher propeller 32 is less than width 52 of flight stabilizer 38. Diameter 64 may be less than width 52 by any ratio. For example, diameter 64 may be 90 percent, 75 percent, 33 percent, 25 percent, 10 percent or 5 percent of width 52 of flight stabilizer 38. While tail rotor 26 is illustrated as being on the port side of compound helicopter 10, in other embodiments tail rotor 26 may be on the starboard side of compound helicopter 10.

Referring to FIGS. 3A-3D in the drawings, drivetrain 100 of modal tailboom flight control system 102 is schematically illustrated for compound helicopter 104. Drivetrain 100 provides rotational energy to both pusher propeller 106 and tail rotor 108. Drivetrain 100 includes a transmission 110 that transfers rotational energy from engines 112 to driveshaft 114. Driveshaft 114 extends through tailboom 116. Both pusher propeller 106 and tail rotor 108 are coupled to driveshaft 114 of drivetrain 100. In some embodiments, drivetrain 100 may maintain a fixed drivetrain ratio between main rotor assembly 118, pusher propeller 106 and tail rotor 108, although a variable drivetrain ratio may also be implemented between these elements in other embodiments.

Driveshaft 114 may be formed from two or more driveshaft segments including one or more intermediate gearboxes 120. Intermediate gearbox 120 may change the gear ratio between transmission 110 and pusher propeller 106, as well as lower the elevation of driveshaft 114 as it extends in the aft direction. Driveshaft 114 includes an extension driveshaft 114a aft of pusher propeller 106 to transmit rotational energy to tail rotor 108. In other embodiments, extension driveshaft 114a and an intermediate driveshaft segment 114b may integrally form a single driveshaft that extends through the rotor hub of pusher propeller 106. In yet other embodiments, two substantially parallel driveshafts may extend through tailboom 116, each providing rotational energy to a respective one of pusher propeller 106 or tail rotor 108.

The thrusts emitted by pusher propeller 106 and tail rotor 108 are separately controllable and operable in a variety of modes including a forward thrust mode and an anti-torque mode despite receiving rotational energy from the same driveshaft 114. Drivetrain 100 utilizes one or more clutches to achieve independent control of pusher propeller 106 and tail rotor 108. In particular, pusher propeller 106 has a gearbox including a pusher propeller clutch 122 and tail rotor 108 has a gearbox including a tail rotor clutch 124. The rotational speeds of pusher propeller 106 and tail rotor 108 are independently controllable using pusher propeller clutch 122 and tail rotor clutch 124. For example, either or both clutches 122, 124 may be utilized to stop or freewheel pusher propeller 106 or tail rotor 108. Pusher propeller clutch 122 and tail rotor clutch 124 may also control the rotational speeds of pusher propeller 106 and tail rotor 108 based on the mode of modal tailboom flight control system 102. For example, pusher propeller clutch 122 may be partially or fully engaged in forward thrust mode to increase the rotational speed and forward thrust generated by pusher propeller 106. Tail rotor clutch 124 may be partially or fully disengaged in forward thrust mode. Conversely, tail rotor clutch 124 may be partially or fully engaged in anti-torque mode to increase the rotational speed and anti-torque thrust generated by tail rotor 108. Pusher propeller clutch 122 may be partially or fully disengaged in anti-torque mode.

In other embodiments, thrusts generated by pusher propeller 106 and tail rotor 108 may be varied by feathering pusher propeller blades 126 and/or tail rotor blades 128. In such embodiments, pusher propeller blades 126 and tail rotor blades 128 are variable pitch rotor blades. In forward thrust mode, pusher propeller blades 126 are pitched to increase the forward thrust generated by pusher propeller 106 and tail rotor blades 128 are pitched to decrease the anti-torque thrust generated by tail rotor 108. In anti-torque mode, tail rotor blades 128 are pitched to increase the anti-torque thrust generated by tail rotor 108 and pusher propeller blades 126 are pitched to decrease the forward thrust generated by pusher propeller 106. In yet other embodiments, one of pusher propeller 106 or tail rotor 108 may be controlled using a clutch while the other of pusher propeller 106 or tail rotor 108 is controlled using a pitch mechanism. For example, the rotational speed of pusher propeller 106 may be controlled using pusher propeller clutch 122 while anti-torque thrust is varied by changing the pitch of tail rotor blades 128.

Figure 4A:
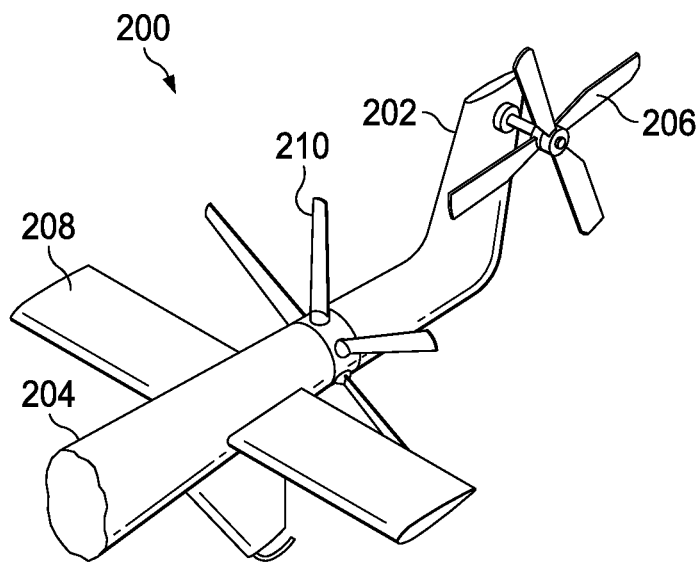
FIGS. 4A-4E are various views of different configurations for a modal tailboom flight control system in accordance with embodiments of the present disclosure.
Figure 4B:
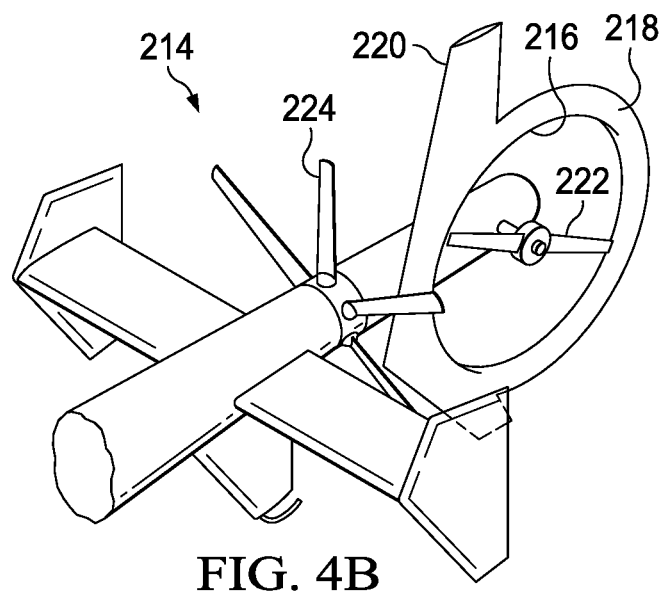

Referring to FIGS. 4A-4E in the drawings, various configurations of a modal tailboom flight control system are schematically illustrated. In FIG. 4A, modal tailboom flight control system 200 includes a vertical fin 202 coupled to the aft end of tailboom 204. Tail rotor 206 is rotatably coupled to vertical fin 202. Vertical fin 202 provides additional yaw stability and may eliminate the need for vertical fins at the outboard ends of horizontal stabilizer 208. Orienting tail rotor 206 at or near the top of vertical fin 202 elevates tail rotor 206 above tailboom 204 and at least partially offsets tail rotor 206 from the slipstream of pusher propeller 210. In FIG. 4B, modal tailboom flight control system 214 includes tail rotor 216 with a surrounding duct 218 and forward vertical fin 220. Duct 218 may enhance the anti-torque thrust generated by tail rotor 216 or enable thrust vectoring. Duct 218 may also protect ground personnel from coming into contact with tail rotor blades 222. Forward vertical fin 220 provides yaw stability while protecting tail rotor blades 222 from debris during forward flight. Forward vertical fin 220 also reduces the amount of drag caused by tail rotor 216 being in the slipstream of pusher propeller 224.

Figure 4C:
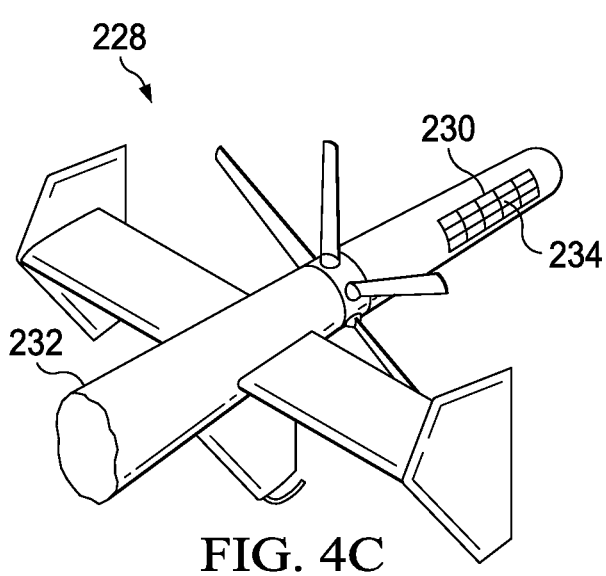
Figure 4D:
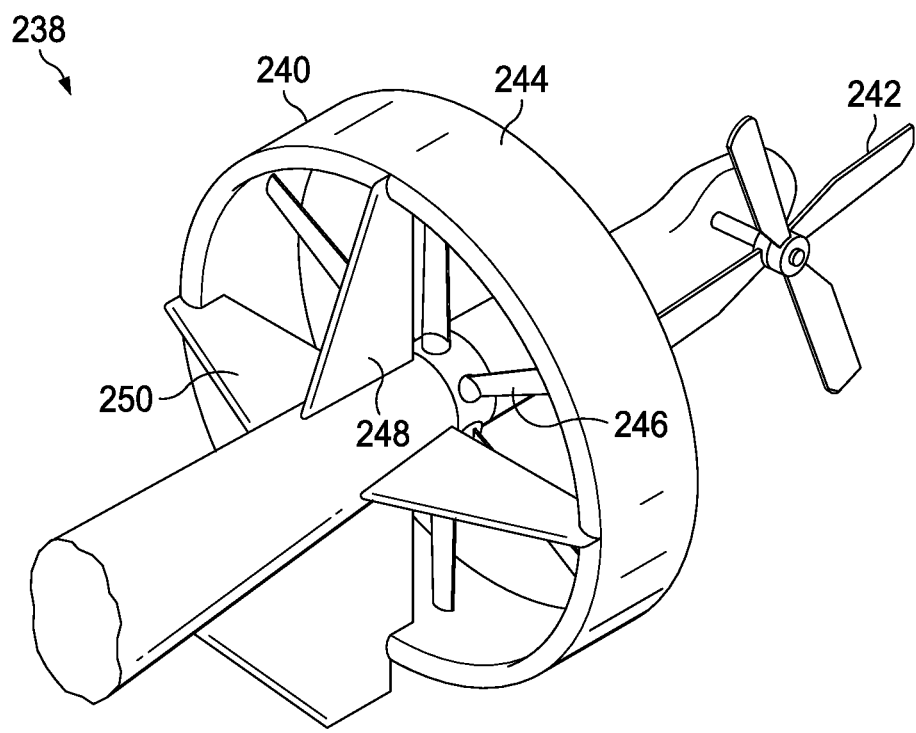
Figure 4E:
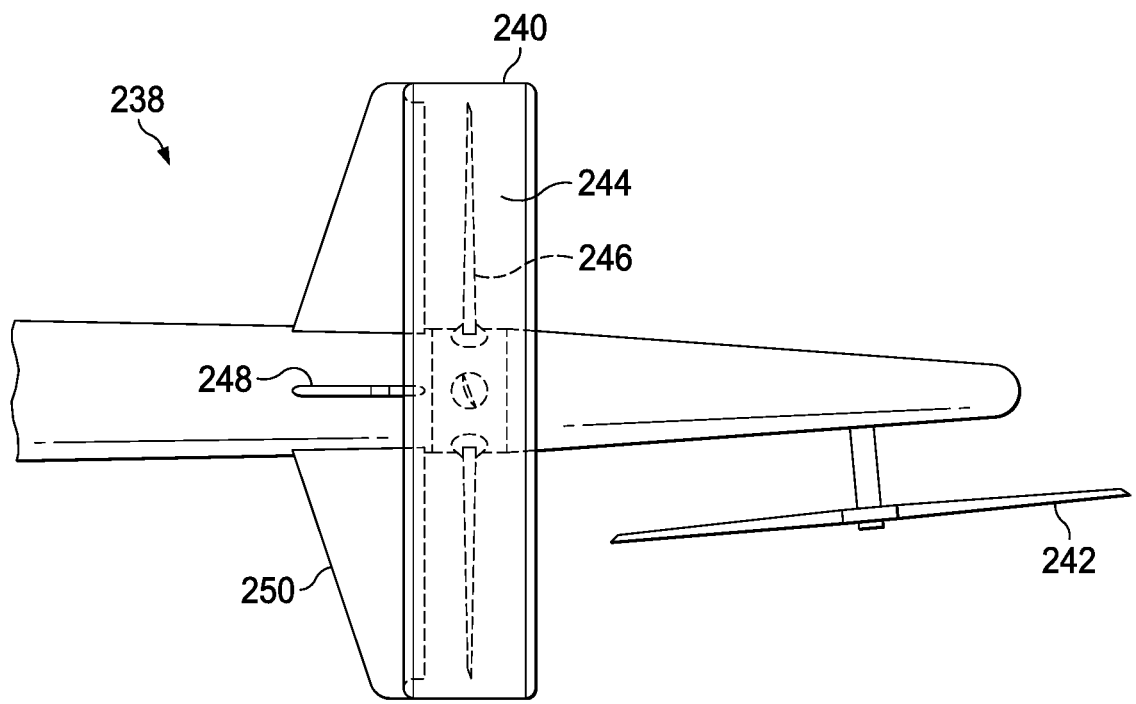

In FIG. 4C, the anti-torque system of modal tailboom flight control system 228 is a cross-flow fan 230, eliminating the need for a tail rotor. Cross-flow fan 230 is disposed on and rotates about the centerline of tailboom 232. Cross-flow fan 230 may be a variable thrust cross-flow fan having a plurality of blades 234 disposed radially outward from the centerline of tailboom 232 such that blades 234 have a generally circular path of travel when cross-flow fan 230 rotates about the centerline of tailboom 232. Blades 234 may be movable between a plurality of pitch angle configurations to generate thrust in either the torque or anti-torque directions. Because cross-flow fan 230 is disposed within tailboom 232, exposure to open rotating blades by ground personnel is reduced. Cross-flow fan 230 may also reduce noise during flight and reduce profile drag in sideward flight. In FIGS. 4D and 4E, modal tailboom flight control system 238 includes a ducted pusher propeller 240 forward of tail rotor 242. Duct 244 protects ducted pusher propeller blades 246 during flight and protects ground personnel from contacting ducted pusher propeller blades 246. Duct 244 may also enable thrust vectoring to enable ducted pusher propeller 240 to emit thrust in different directions. Ducted pusher propeller 240 includes vertical fins 248 and horizontal fins 250 for yaw and pitch stability as well as to protect ducted pusher propeller blades 246. In yet other embodiments, both ducted pusher propeller 240 and tail rotor 242 may include a duct.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A modal tailboom flight control system for a compound helicopter operable in a plurality of modes including a forward thrust mode and an anti-torque mode comprising:
   a tailboom;
   a drivetrain extending through the tailboom;
   an anti-torque system coupled to the drivetrain and rotatable to generate anti-torque thrust for the compound helicopter in the anti-torque mode;
   a pusher propeller coupled to the drivetrain and rotatable to generate forward thrust for the compound helicopter in the forward thrust mode; and
   a flight stabilizer positioned forward of the pusher propeller;
   wherein, the pusher propeller is positioned forward of the anti-torque system.

2. The modal tailboom flight control system as recited in claim 1 wherein the rotational speed of the pusher propeller increases relative to the rotational speed of the anti-torque system in the forward thrust mode; and
  wherein the rotational speed of the pusher propeller decreases relative to the rotational speed of the anti-torque system in the anti-torque mode.

3. The modal tailboom flight control system as recited in claim 1 wherein the pusher propeller and the anti-torque system each further comprise variable pitch rotor blades;
  wherein the variable pitch rotor blades of the pusher propeller are pitched to increase the forward thrust generated by the pusher propeller in the forward thrust mode; and
  wherein the variable pitch rotor blades of the anti-torque system are pitched to increase the anti-torque thrust generated by the anti-torque system in the anti-torque mode.

4. The modal tailboom flight control system as recited in claim 1 wherein the compound helicopter is operable in a forward flight mode and a vertical takeoff and landing mode; and
  wherein the modal tailboom flight control system is in the forward thrust mode when the compound helicopter is in the forward flight mode and in the anti-torque mode when the compound helicopter is in the vertical takeoff and landing mode.

5. The modal tailboom flight control system as recited in claim 1 wherein the anti-torque system further comprises a tail rotor.

6. The modal tailboom flight control system as recited in claim 5 wherein the tail rotor further comprises a tail rotor hub assembly offset by a distance D from a centerline of the compound helicopter;
  wherein the pusher propeller has a radius R; and
  wherein D<R.

7. The modal tailboom flight control system as recited in claim 1 wherein the pusher propeller further comprises a rotor hub fairing substantially flush with the tailboom.

8. The modal tailboom flight control system as recited in claim 1 wherein the flight stabilizer at least partially obstructs a forward side of the pusher propeller to protect the pusher propeller.

9. The modal tailboom flight control system as recited in claim 1 wherein the flight stabilizer further comprises a horizontal stabilizer.

10. The modal tailboom flight control system as recited in claim 9 wherein the pusher propeller has a diameter D;
  wherein the horizontal stabilizer has a width W; and
  wherein D<W.

11. The modal tailboom flight control system as recited in claim 9 wherein the anti-torque system further comprises a tail rotor hub assembly offset by a distance D from a centerline of the compound helicopter;
  wherein the horizontal stabilizer has a width W; and
  wherein D<W/2.

12. The modal tailboom flight control system as recited in claim 9 wherein the flight stabilizer further comprises vertical fins coupled to outboard ends of the horizontal stabilizer.

13. A compound helicopter comprising:
  a fuselage;
  a modal tailboom flight control system coupled to the fuselage and operable in a plurality of modes including a forward thrust mode and an anti-torque mode, the modal tailboom flight control system comprising:
  a tailboom;
  a drivetrain extending through the tailboom;
  an anti-torque system coupled to the drivetrain and rotatable to generate anti-torque thrust in the anti-torque mode;
  a pusher propeller coupled to the drivetrain and rotatable to generate forward thrust in the forward thrust mode; and
  a flight stabilizer positioned forward of the pusher propeller;
  wherein, the pusher propeller is positioned forward of the anti-torque system.

14. The compound helicopter as recited in claim 13 wherein the drivetrain further comprises a pusher propeller clutch and an anti-torque system clutch; and
  wherein the rotational speeds of the pusher propeller and the anti-torque system are independently controllable using the pusher propeller clutch and the anti-torque system clutch.

15. The compound helicopter as recited in claim 13 wherein the drivetrain further comprises an extension driveshaft aft of the pusher propeller to transmit rotational energy to the anti-torque system.

16. The compound helicopter as recited in claim 13 further comprising first and second wings protruding from the sides of the fuselage.

17. The compound helicopter as recited in claim 16 wherein the flight stabilizer has a width W;
  wherein the first and second wings form a wingspan Z; and
  wherein W<Z.

18. The compound helicopter as recited in claim 13 wherein the mode of the modal tailboom flight control system is switchable based on pilot input.

* * * * *